United States Patent
Sonoda et al.

(10) Patent No.: US 6,396,721 B1
(45) Date of Patent: May 28, 2002

(54) POWER CONVERTER CONTROL DEVICE AND POWER CONVERTER THEREOF

(75) Inventors: Michiyoshi Sonoda; Ryo Otsubo, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/557,159

(22) Filed: Apr. 25, 2000

(30) Foreign Application Priority Data

Feb. 3, 2000 (JP) ........................................ 2000-025841

(51) Int. Cl.⁷ .................................................. H02M 3/24
(52) U.S. Cl. ........................ 363/98; 363/56.02; 363/132
(58) Field of Search .............. 363/17, 55, 56.01–56.05, 363/59, 98, 132; 361/18

(56) References Cited

U.S. PATENT DOCUMENTS 5,929,665 A * 7/1999 Ichikawa et al. ......... 363/98 X
5,942,886 A * 8/1999 Kelly ...................... 361/18 X

FOREIGN PATENT DOCUMENTS

| JP | 3-26281 | 3/1991 |
| JP | 4-322173 | 11/1992 |
| JP | 5-3680 | 1/1993 |

* cited by examiner

*Primary Examiner*—Jessica Han
(74) *Attorney, Agent, or Firm*—Oblon, Spivak, McClelland, Maier & Neustadt, P.C.

(57) ABSTRACT

When an over-current is detected as flowing in semiconductor devices of a power converter by a Hall CT (current transformer), an abnormality detection unit outputs an abnormality signal. If the abnormality signal is output from the abnormality detection unit, a gate breaking unit of a gate driving unit outputs a gate breaking signal to stop the power converter. At the same time, a gate ON unit maintains the gate signal of the semiconductor device that has become abnormal in the ON state and, after the current in the semiconductor device has become smaller than a specified value, the gate signal of the semiconductor device is rendered OFF by a gate constriction device. By this operation, the current flowing in the semiconductor device may be reduced prior to any gate breaking operation occurring.

15 Claims, 6 Drawing Sheets

US 6,396,721 B1

POWER CONVERTER CONTROL DEVICE AND POWER CONVERTER THEREOF

BACKGROUND OF THE INVENTION

1. Field of the Invention

The present invention relates to a power converter control device for protecting the semiconductor devices of power converters from damage due to over-currents, and a power converter thereof.

2. Description of the Related Art

Generally, a power converter for supplying a variable frequency power source to a load is one that converts a DC power source to an AC of a specified frequency and supplies that to the load. When the DC power source is not directly obtainable, the design is such that a converter device is provided and the DC power source is obtained from the AC power source.

FIG. 1 is a block diagram of power converter 6 and its control device 7 thereof that drive electric motor 5, which is the load, by converting the power source from 3-phase AC power source 1 to a DC power source by converter 2 and converting that DC power source to an AC power source of a specified frequency by inverter device 4.

In converter device 2, the R phase from 3-phase AC power source 1 is inputted to the node between semiconductor device 2U and semiconductor device 2X, the S phase to the node between semiconductor device 2V and semiconductor device 2Y, and the T phase to the node between semiconductor device 2W and semiconductor device 2Z, respectively, and the 3-phase AC is converted to DC. The DC converted by converter device 2 is outputted to the P bus-line (the positive side bus-line) and the N bus-line (the negative side bus-line), is smoothed by smoothing capacitor 3 connected between this P bus-line and N bus-line, and is inputted to inverter device 4.

In inverter device 4, the DC converted by converter device 2 is inputted from the P bus-line and the N bus-line. The design is such that a U phase is outputted from the node between semiconductor device 4U and semiconductor device 4X, a V phase from the node between semiconductor device 4V and semiconductor device 4Y, and a W phase from the node between semiconductor device 4W and semiconductor device 4Z, respectively, and these are outputted to electric motor 5, which is the load.

There are cases of single composition in which each of semiconductor devices 2U~2Z and 4U~4Z is composed of one semiconductor device, and cases of parallel-connection composition in which each is composed by the parallel connection of multiple semiconductor devices.

With this type of power converter 6, power converter control device 7 is provided for exercising control of power converter 6. Power converter control device 7 is provided with gate driving unit 8 that drives the gates of the semiconductor devices in power converter 6, abnormality detection unit 9 that detects any exceeding of a specified value by the currents flowing in the semiconductor devices of power converter 6 and outputs an abnormality signal, and control unit 10 that controls power converter 6 by sending gate signals to gate driving unit 8. It is designed to detect abnormalities in the semiconductor devices or load short-circuits as abnormality signals, and to take protective action.

However, with a power converter 6 that uses, for example, IGBT (Insulated Gate Bipolar Transistors) as the semiconductor devices, the semiconductor devices have low resistance to short circuits. Therefore, if a DC short-circuit occurs, even if the protective action operates, the detection time will not meet the requirements, and there will be cases when damage occurs to the semiconductor devices.

Here, an IGBT is a static induction self turn-off device and has characteristics that are intermediate between those of a transistor and a thyristor in that, while exhibiting a low constant-current characteristic approaching that of a transistor in the low gate voltage range, when the gate voltage becomes higher, it exhibits a voltage drop approaching that of a thyristor. This IGBT has a safe operation domain in which it may normally operate safely provided the collector current is restricted. However, in a case such as, for example, the occurrence of a load short-circuit, it becomes unstable to operate in the safe operation domain, a large collector current flows, and damage may occur to the semiconductor device.

When an over-current flows in a semiconductor device (IGBT), abnormality detection unit 9 detects that fact, and a gate breaking action is performed by control unit 10 via gate driving unit 8. However, time is consumed from abnormality detection to gate breaking and, particularly in the case of the semiconductor devices being IGBT, there is a risk that the devices will be damaged in the time until gate breaking is executed.

SUMMARY OF THE INVENTION

Accordingly, one object of the present invention is to provide a novel power converter control device that may perform its protective action correctly and prevent device damage, even if an abnormality occurs in which a large current flows in the semiconductor devices.

In order to achieve the above object, the present invention has the following composition. That is to say, in a power converter control device provided with:

a gate driving unit that drives the gates of the semiconductor devices of the power converter;

an abnormality detection unit that detects the fact that the current flowing in the semiconductor device of this power converter has exceeded a specified value, and outputs an abnormality signal;

a control unit that controls the power converter by sending gate signals to the above-mentioned gate driving unit, the present invention is a power converter control device in which the above-mentioned gate driving unit is provided with:

a gate constriction means that constricts the semiconductor device gates when an abnormality signal is inputted from the above-mentioned abnormality detection unit; and a gate breaking output means that outputs a gate breaking signal to stop the above-mentioned power converter.

Also, in order to achieve the above object, the present invention has the following composition. That is to say, in a power converter control device provided with:

a gate driving unit that drives the gates of the semiconductor devices of the power converter;

an abnormality detection unit that detects the fact that the current flowing in the semiconductor device of this power converter has exceeded a specified value, and outputs an abnormality signal;

a control unit that controls the power converter by sending gate signals to the above-mentioned gate driving unit, the present invention is a power converter control device in which the above-mentioned gate driving unit is provided with:

a gate constriction means that constricts the semiconductor device gates when an abnormality signal is inputted from the above-mentioned abnormality detection unit;

a gate breaking output means that outputs a gate breaking signal to stop the above-mentioned power converter; and a gate ON means that maintains the gate signal of any semiconductor device that has become abnormal in the ON state, and turns OFF the gate signals of the semiconductor devices after the current of the semiconductor devices has become less than a specified value.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
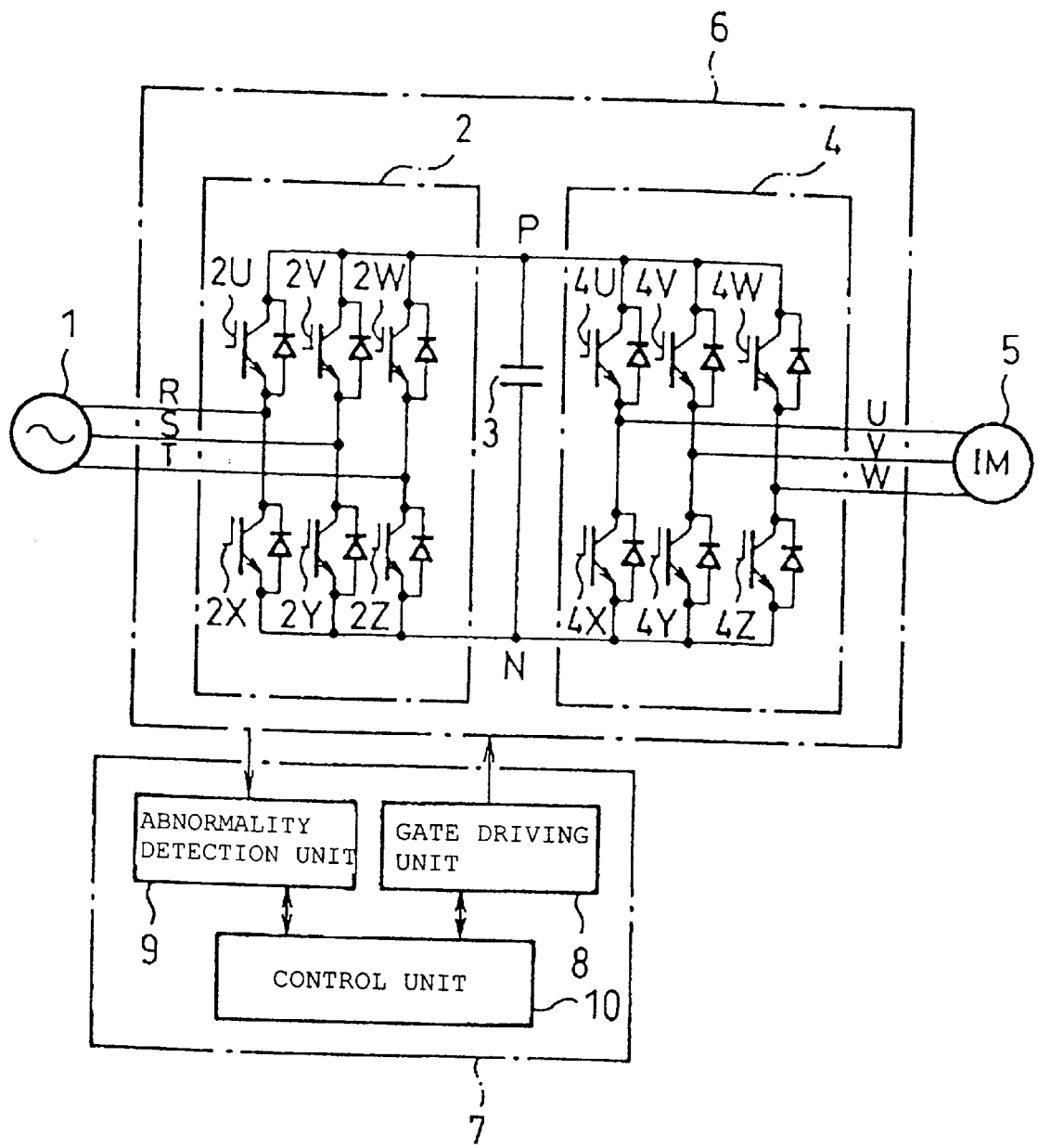
FIG. 1 is a block diagram of the case of a prior art power converter control device applied to a power converter.

Referring now to the drawings, wherein like reference numerals designate identical or corresponding parts throughout the several views, and more particularly to FIG. 2 thereof, one embodiment of the present invention will be described.

Figure 2:
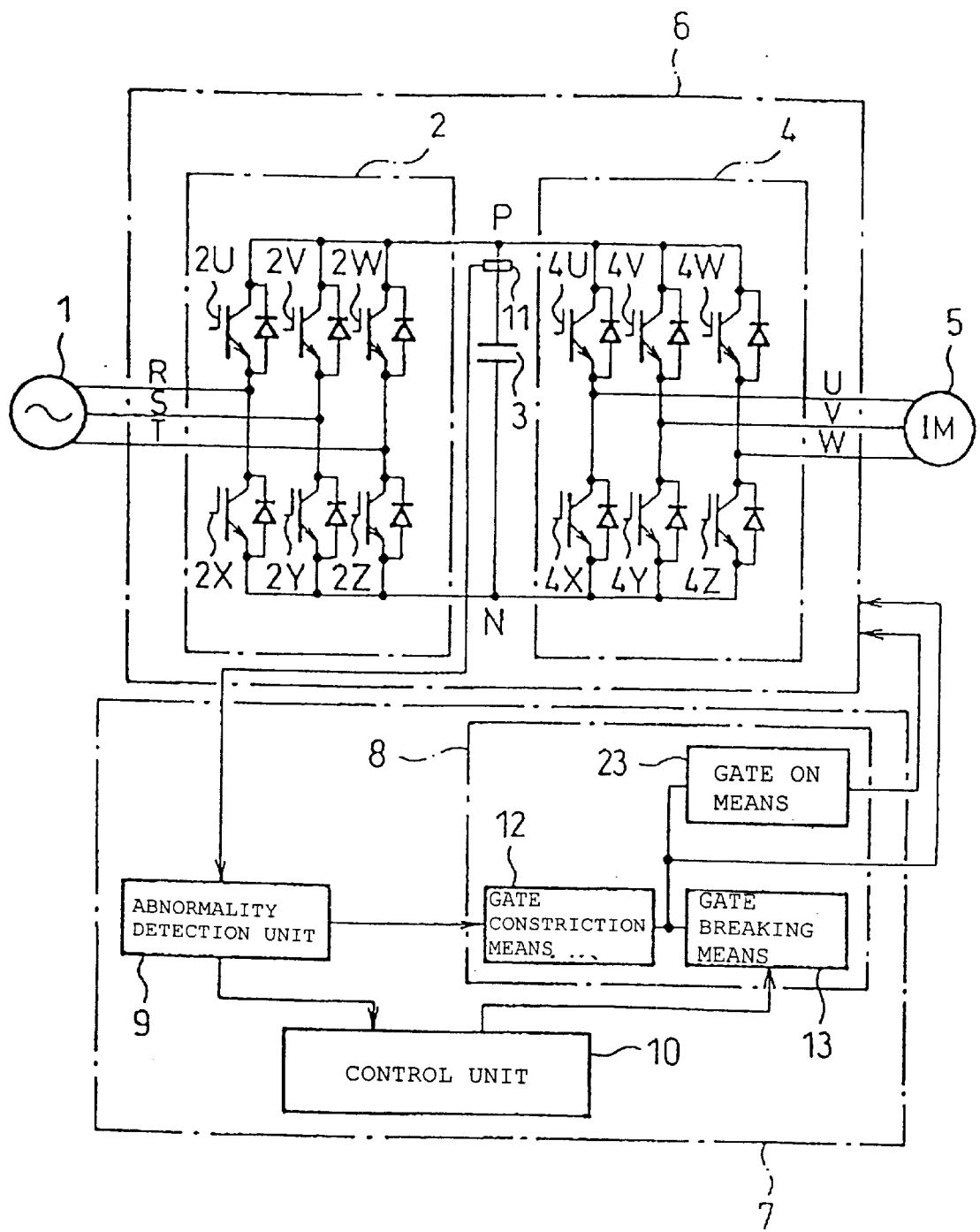
FIG. 2 is a block diagram of case of the power converter control device relating to an embodiment of the present invention applied to a power converter.

FIG. 2 is a block diagram of the case of the power converter control device relating to an embodiment of the present invention applied to a power converter.

In FIG. 2, power source from 3-phase AC power source 1 is converted to DC power source by converter 2 and outputted to the P bus-line (the positive bus-line) and the N bus-line (the negative bus-line) of the DC bus. Smoothing capacitor 3 is provided between the P bus-line and the N bus-line. The DC power source smoothed by this is converted to power with a specified frequency by inverter device 4 and outputted to electric motor 5, which is the load.

In converter device 2, the R phase from 3-phase AC power source 1 is inputted to the node between semiconductor device 2U and semiconductor device 2X, the S phase is inputted to the node between semiconductor device 2V and semiconductor device 2Y, and the T phase is inputted to the node between semiconductor device 2W and semiconductor device 2Z, and the 3-phase AC is converted to DC in this way.

Also, in inverter device 4, a U phase is outputted from the node between semiconductor device 4U and semiconductor device 4X, a V phase is outputted from the node between semiconductor device 4V and semiconductor device 4Y, and a W phase is outputted from the node between semiconductor device 4W and semiconductor device 4Z, and these are outputted to electric motor 5, which is the load.

Hall CT (Current Transformer) 11 for detecting the current flowing in the semiconductor devices composing power converter 6 is provided on the positive side of smoothing capacitor 3 that is connected to the P bus-line and the N bus-line. This Hall CT is provided by penetrating a conductor that detects current, and may detect current without a power source and at high speed. Current monitors made by PEARSON ELECTRONICS, for example, may be used, and only output a signal when there is a current variation (fluctuation).

The current detected by Hall CT 11 is inputted to abnormality detection unit 9 of power converter 7, where it is determined whether or not the value of that current exceeds a specified value. Then, when the current value exceeds the specified value, an abnormality signal is outputted to control unit 10. Control unit 10, while there is no abnormality signal from abnormality detection unit 9, controls power converter 6 by outputting specified gate signals to gate driving unit 8.

Gate driving unit 8 drives the gates of each semiconductor device of power converter 6 based on gate signals from control unit 10, and possesses gate constriction means 12 that is started if an abnormality signal is inputted from abnormality detection unit 9, gate breaking means 13 and gate ON means 23.

Gate constriction means 12 is started if an abnormality signal is inputted from abnormality detection unit 9 and immediately constricts the gate of the corresponding semiconductor device and acts to control the current flowing in that semiconductor device. Also, gate breaking (interrupting) means 13 outputs gate OFF signals to each semiconductor device that will stop the operation of power converter 6.

Also, gate ON means 23, when an abnormality signal is inputted from abnormality detection unit 9, causes the primary side of the gate of the semiconductor device in which a short-circuit current has started to flow to continue, as it is, in the ON state, and acts to turn OFF the primary side of the gate of that semiconductor device after the current has been sufficiently reduced by gate constriction means 12.

This is because, in the case of the cause of a DC short-circuit in a semiconductor device being a malfunction due to noise, the gate signal momentarily becomes ON when it should, properly speaking, be OFF and a short-circuit current flows during that period only, and during constriction of the gate by gate constriction means 12 it can be considered to become properly OFF. In such a case, when the current is not sufficiently reduced by constriction, the semiconductor device becomes turned OFF, and a large surge voltage results. If the surge voltage exceeds the withstand-voltage of the semiconductor device, the semiconductor device will be damaged.

Therefore the design is that, when a short-circuit current starts to flow in a semiconductor device, the primary side of the gate is maintained in the ON state by gate ON means 23, and is turned OFF after the current has reduced sufficiently.

In this case it is desirable that, when an abnormality signal has been inputted from abnormality detection unit 9, gate ON means 23 is designed forcibly to maintain in the ON state the gate signals of all the semiconductor devices, not just for the semiconductor device that has become abnormal, but also for the normal semiconductor devices, regardless of whether they are ON or OFF. That is to say, gate ON means 23 is designed forcibly to put all the semiconductor devices into the ON state for just a specified period after an abnormality signal has been inputted from abnormality detection device 9 and, after the specified period has elapsed, to turn OFF the gate signals of all the semi-conductor devices once more.

Figure 3:
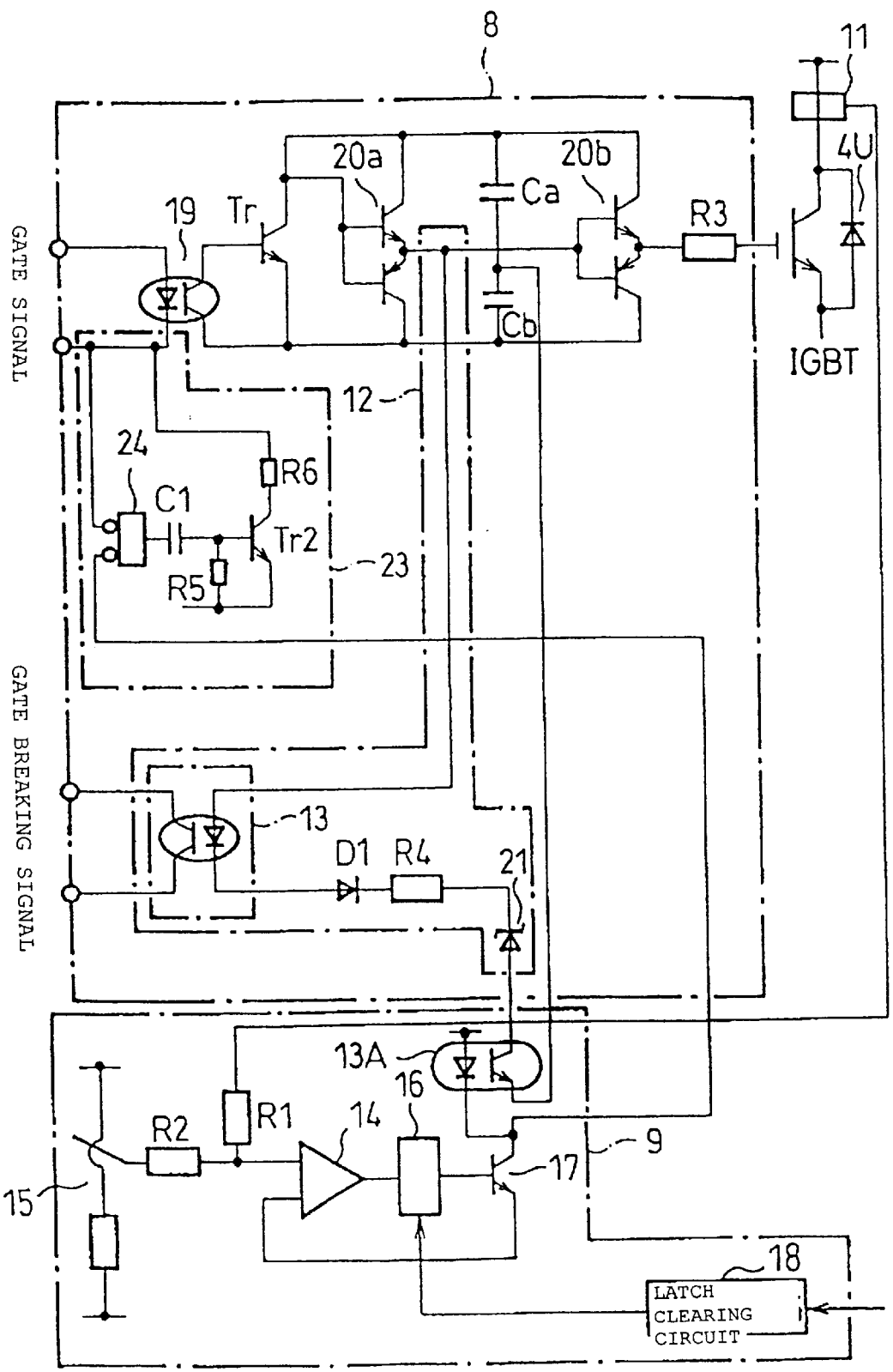
FIG. 3 is a circuit block diagram of the gate driving unit and the abnormality detection unit in an embodiment of the present invention.

FIG. 3 is a circuit block diagram of gate driving unit 8 and abnormality detection unit 9. In FIG. 3, the case applied to semiconductor device 4U of inverter device 4 is shown, and the case of using an IGBT as semiconductor device 4U is shown.

Hall CT 11 is interposed between the P side (positive side) of semiconductor device 4U and the P side (positive side) of the smoothing capacitor. The current detected by Hall CT 11 is inputted to abnormality detection unit 9. In abnormality detection unit 9, the current detected by Hall CT 11 is inputted to comparator 14 via resistor R1. At the same time, setter 15 for setting a specified value of current is provided in abnormality detection unit 9, and the specified value set by setter 15 is inputted to comparator 14 via resistor R2.

In comparator 14, if the current detected by Hall CT 11 exceeds the specified value set by setter 15, that detection signal is outputted to latching circuit 16. In latching circuit 16, the detection signal from comparator 14 is held (latched) and, as well as driving drive transistor 17, insulating photocoupler 13A is turned ON. By this means, an abnormality signal is outputted to gate driving circuit 8.

Latch clearing circuit 18 clears the latch of latching circuit 16, and is used when causing re-start after an over-current to semiconductor device 4U has been detected and, for example, power transformer 6 has stopped. Latch clearing circuit 18 is started by a command from control unit 10 and is put into a state of being re-controllable.

At the same time, in gate driving unit 8, the composition is such that the gate signal from control unit 10 is inputted to input transistor Tr via photocoupler 19, amplified by amplifiers 20a and 20b, which are composed of complementary-connected NPN transistors and PNP transistors, and is inputted to semiconductor device 4U via resistor R3. Capacitors Ca and Cb are capacitors for supplying control power.

Gate constriction means 12 that is formed inside gate driving unit 8, when an abnormality signal is inputted from abnormality detection unit 9, reduces the voltage of the gate power for driving semiconductor device 4U. By this means it constricts the gate signal to semiconductor device 4U. Also, at that time, gate breaking means 13, which is composed of a photocoupler, operates and outputs a gate breaking signal.

That is to say, the abnormality signal from abnormality detection unit 9 is generated by drive transistor 17 of abnormality detection unit 9 turning ON. The phototransistor of insulating photocoupler 13A is turned ON by the turning ON of drive transistor 17, and constant-voltage diode 21 of gate constriction means 12 turns ON. By this means, current flows from the gate power source via gate breaking means 13, diode D1 and resistor R4, gate breaking means 13 acts, and a gate breaking signal is outputted. In this case, since constant-voltage diode 21 maintains a constant voltage, the voltage of the gate power source becomes equal to the constant voltage of constant-voltage diode 21.

When drive transistor 17 is ON, it causes the voltage of the gate power source that drives semiconductor device 4U to fall to the constant voltage of constant-voltage diode 21. Since the gate constriction operation by gate constriction means 12 directly reduces the gate power source from gate constriction means 12 to the semi-conductor device, that operation is rapid. On the other hand, since the gate breaking operation is inputted to gate driving unit 8 via control unit 10, some time is taken until the gate breaking operation is executed.

By this means, prior to the arrival of a power converter 6 "stop" command by a gate breaking signal, the gate signal to semiconductor device 4U may rapidly be constricted, and the current flowing in semiconductor device 4U may be controlled. Consequently, semiconductor device 4U may be adequately protected.

Next, when transistor 17 of abnormality detection unit 9 is ON and also the primary side of the gate of a semiconductor device is ON, gate ON means 23 forcibly maintains the gate signal of that semiconductor device in the ON state, and turns the primary side of the gate of that semiconductor device OFF after the current has been sufficiently reduced by gate constriction means 12.

That is to say, logical NOR circuit 24 of gate ON means 23 turns ON only when drive transistor 17 of abnormality detection unit 9 is ON (input signal signal-level L) and the of gate signal has been turned ON (input signal level L). Transistor Tr2 is instantly turned ON via capacitor C1 through logical NOR circuit 24 turning ON, and the gate signal of the semiconductor device is forcibly maintained in the ON state via resistor R6.

A differentiation circuit is composed by capacitor C1, resistor R5 and transistor Tr2. Therefore, when a period of time related to the time constant of capacitor C1 and resistor R5 has elapsed, the current flowing in capacitor C1 decreases and, finally, transistor Tr5 turns OFF. Thus, even though, due to gate ON means 23, latch circuit 16 maintains latching of the abnormality signal, when the constant time has elapsed after latching, gate ON means 23 cancels the forced ON condition of the primary side gate signal, and the gate signal becomes OFF.

Consequently, when a current large enough to be detected by abnormality detection unit 9 flows in a semi-conductor device, the appropriate semiconductor device may be turned OFF and may be protected against damage due to any surge voltage.

In the above description, the design is that only when drive transistor 17 of abnormality detection unit 9 is ON (input signal signal-level L) and the gate signal is ON (input signal level L) is the gate signal extended and held in the ON state. However, the design may also be to turn the gate ON when drive transistor 17 of abnormality detection unit 9 is ON, regardless of the state of the gate signal. The gate ON means 23 for that case is shown in FIG. 4.

Figure 4:
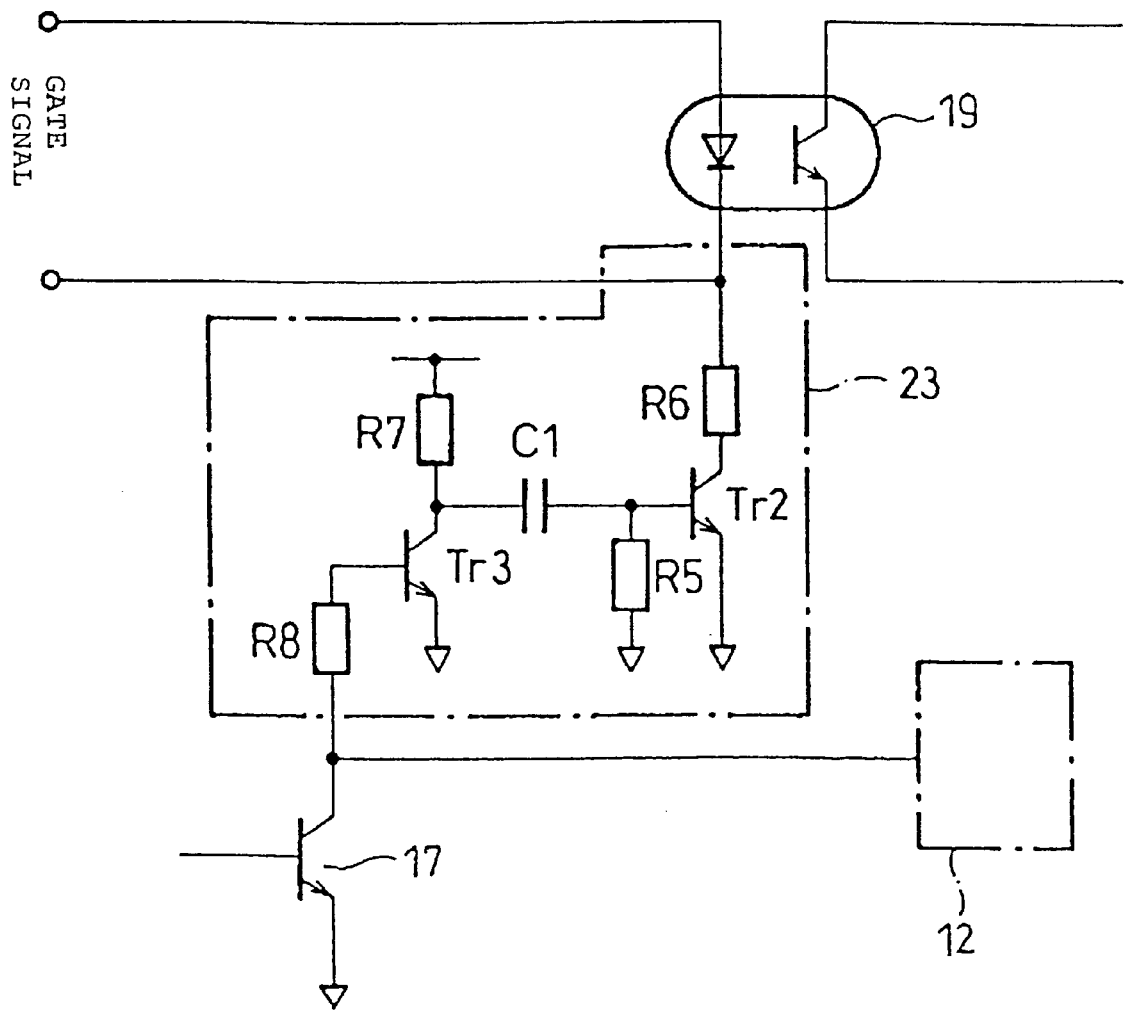
FIG. 4 is a block circuit diagram of the gate ON means in an embodiment of the present invention.

In FIG. 4, when drive transistor 17 of abnormality detection unit 9 has turned ON, since the base—emitter voltage of transistor Tr3 becomes 0V via resistor R8 of gate ON means 23, transistor Tr3 turns OFF.

By this means, because a base current flows in transistor Tr2 using capacitor C1, transistor Tr2 comes ON only momentarily, in the same way as in FIG. 3, and the gate signal for the semiconductor device is forcibly maintained in the ON state. Then the short-circuit current is constricted by gate constriction device 12, and, after a constant time period determined by resistor R5 and capacitor C1, transistor Tr2 turns OFF and the gate signal of the semiconductor device becomes OFF.

Consequently, when a current large enough to be detected by abnormality detection unit 9 flows in a semi-conductor device, the appropriate semiconductor device may be turned OFF and may be protected against damage due to any surge voltage.

Here, in the case of power converter 6 possessing both inverter device 4 and converter device 2, detection accuracy is increased by providing one Hall CT 11 each for inverter device 4 and converter device 2. In this case, Hall CTs 11 are provided on the positive side (the P bus-line side) or the negative side (the N bus-line side) of smoothing capacitor 3.

Also, when each semiconductor device of power converter 6 has a parallel-connected composition and smoothing capacitors 3 are also parallel-connected, Hall CT 11 is connected in the location where a current equivalent to that of the semiconductor devices will flow most easily. In other words, it is provided on the positive side or the negative side of at least one smoothing capacitor. By this means, as well as detection sensitivity being increased, economies may be made in the numbers of Hall CTs 11 installed.

Moreover, when the semiconductor devices of power converter 6 have a single composition and smoothing capacitors 3 are parallel-connected, Hall CT 11 is connected in the location where a current equivalent to that of the semiconductor devices will flow most easily. In other words, it is provided on the positive side or the negative side of at least one smoothing capacitor. By this means, as well as detection sensitivity being increased, economies can be made in the numbers of Hall CTs 11 installed.

Furthermore, when the semiconductor devices of power converter 6 are of parallel-connected composition and the U-phase, V-phase and W-phase semiconductor device stacks are separated phase by phase, Hall CT 11 is provided only on the center V-phase closest to the positive side (P side) or the negative side (N side) of smoothing capacitor 3. By this means, as well as detection sensitivity being increased, economies may be made in the numbers of Hall CTs 11 installed.

Figure 5:
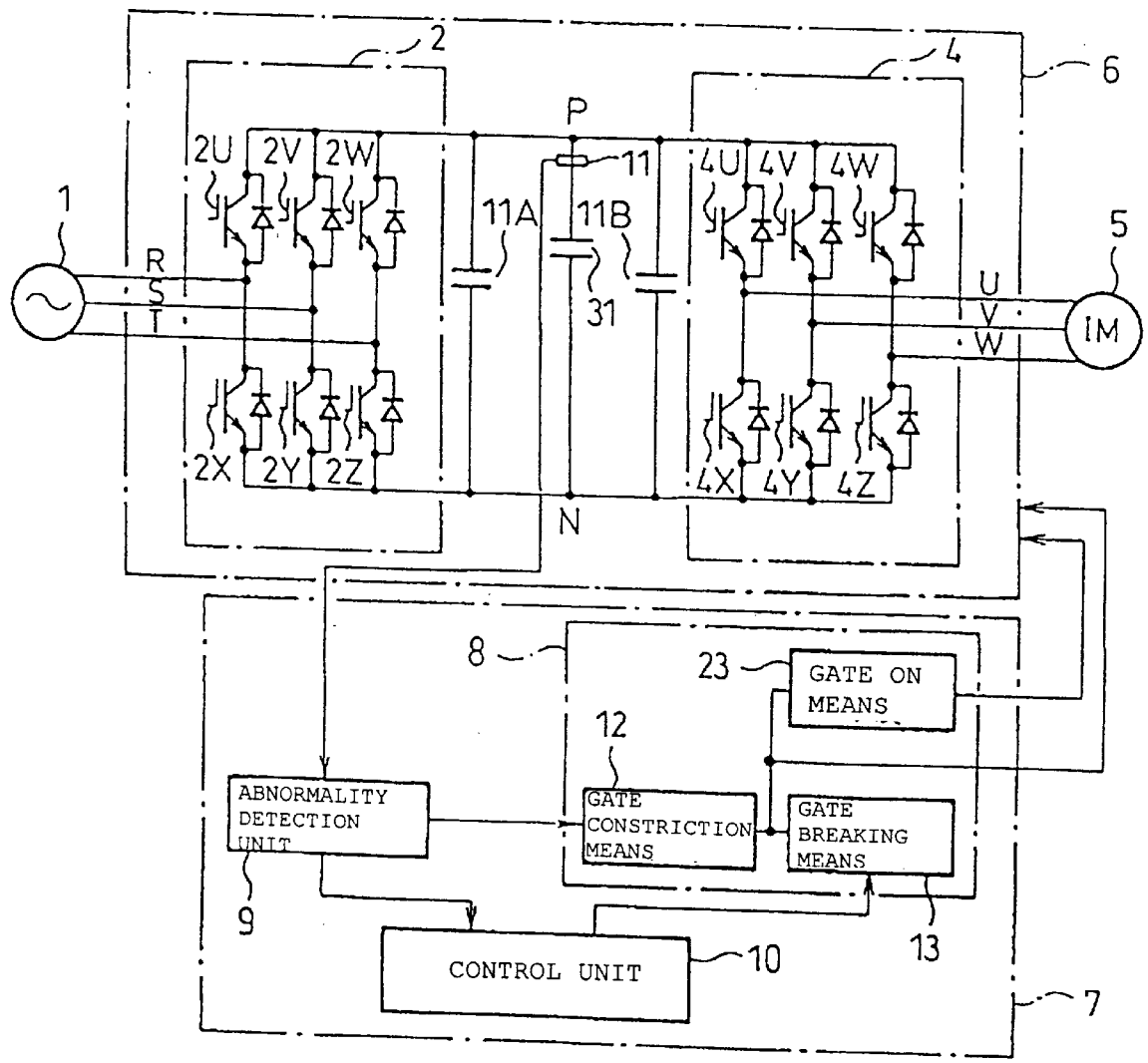
FIG. 5 is an illustration of the fitting of a Hall CT in a case when smoothing capacitors are parallel-connected and a capacitor for short circuit detection is provided in an embodiment of the present invention.

Here, when smoothing capacitors are parallel-connected, as shown in FIG. 5, by connecting short-circuit detection capacitor 31 that differs from smoothing capacitors 11A and 11B in a position that becomes uniform composition-wise with regard to the positive side bus-line and the negative side bus-line of the power converter, it is possible also to provide Hall CT 11 on the positive side or the negative side of this short-circuit detection capacitor 31.

In FIG. 5, short-circuit capacitor 31 is provided between smoothing capacitor 11A, installed on the converter side, and smoothing capacitor 11B, installed on the inverter side. Short-circuit detection capacitor 31 is a capacitor of substantially smaller capacitance than the capacitances of smoothing capacitors 11A and 11B, and Hall CT 11 is installed on the positive side or the negative side of short-circuit detection capacitor 31.

Figure 6:
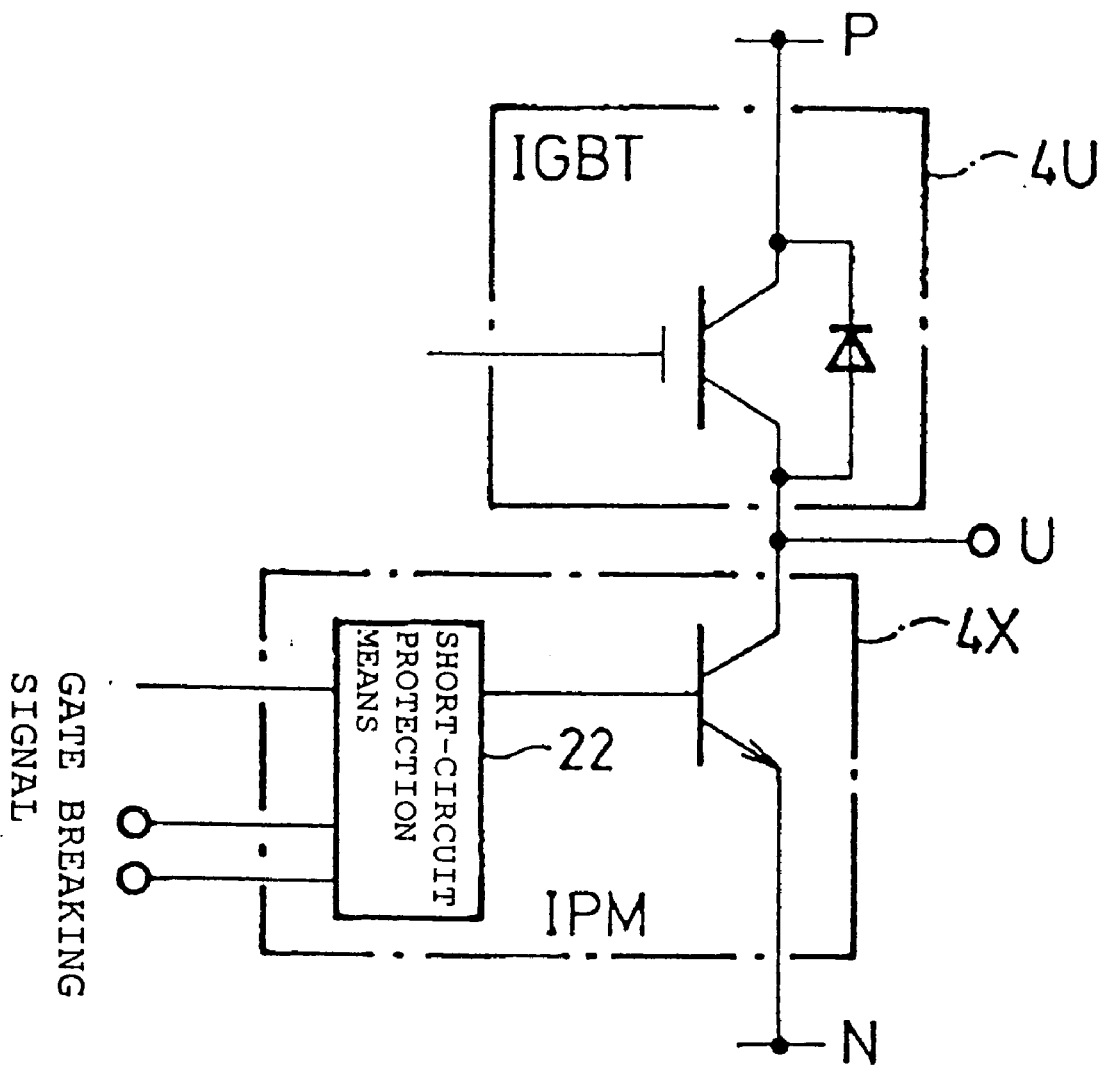
FIG. 6 is a block diagram of the U phase arm of the inverter device in a power converter relating to an embodiment of the present invention.

Next, FIG. 6 is a block diagram of the U-phase arm of the inverter device in a power converter relating to an embodiment of the present invention. Although only the U-phase arm of inverter device 4 is shown in FIG. 6, the other arms are composed in the same way. Also, the arms for each phase of converter device 2 are composed in the same way.

In FIG. 6, inverter device 4 is composed by using one semiconductor device 4U in one direction (the P side) of the arm in the U-phase of inverter device 4 and using one semi-conductor device 4X, which, of itself, possesses a short-circuit protection function, in the other direction (the N side) of the arm. In this case, an IGBT is used as semi-conductor device 4U on the P side and an IPM (Integrated Power Module) is used as semiconductor device 4X on the N side.

The IPM possesses short-circuit protection means 22, and itself executes short-circuit protection action by means of short-circuit protection means 22. That is to say, when the current flowing in the switching element inside the IPM exceeds a specified value, short-circuit protection means 22 operates and outputs a-gate breaking signal while at the same time executing the required protective action for the switching element. By this means short-circuit protection against an arm short-circuit occurring in one phase of a power converter becomes possible, and reduction of device cost may also be designed.

As described above, when using the present invention, when an over-current flows in a semiconductor device composing a power converter, the current flowing in the semi-conductor device is rapidly reduced by a gate constriction means. Consequently, since the current flowing in the semi-conductor device may be reduced prior to the performance of a gate breaking action, the semiconductor device may be adequately protected.

Also, since the semiconductor device does not turn OFF when an over-current flows, it is possible to suppress the OFF surge voltage and adequate protection is possible.

Moreover, for an over-current flowing in the semi-conductor device, since a high-speed Hall CT is used that does not require power source, gate constriction and breaking become possible by the Hall CT detecting the short-circuit current without any malfunction through noise and, moreover at high speed. At the same time, since the Hall CT is installed on the plus side of a smoothing capacitor that adequately performs detection of over-currents flowing in the semi-conductor device, detection accuracy may be increased.

Furthermore, in the case of using IPM, in which the devices themselves possess a short-circuit protection function, in either the upper or lower parts of the semi-conductor device arms that compose each arm of a power converter, as well as reliably providing arm short-circuit protection, reduction of device cost may be designed.

Obviously, numerous additional modifications and variations of the present invention are possible in light of the above teachings. It is therefore to be understood that, within the scope of the appended claims, the present invention may be practised otherwise than as specially described herein.

What is claimed is:

1. A power converter control device, comprising:
    a gate driving unit configured to drive gates of semiconductor devices of a power converter;
    an abnormality detection unit configured to detect the fact that a current flowing in said semiconductor devices of said power converter has exceeded a specified value, and to output an abnormality signal when that fact is detected;
    a control unit configured to send gate signals to said gate driving unit and to control said power converter, wherein said gate driving unit comprises:
        a gate constriction unit configured to constrict current supplied to gates of said semiconductor devices when an abnormality signal is inputted from said abnormality detection unit, and
        a gate breaking output unit configured to output gate breaking signals for stopping said power converter.

2. A power converter control device according to claim 1, further comprising:
    one IGBT (insulated gate bipolar transistor) on a first side of each arm of the power converter; and
    one IPM (integrated power module) with a short-circuit protection function on a second side, opposite said first side, of each arm of the power converter.

3. A power converter control device, comprising:
a gate driving unit configured to drive gates of semiconductor devices of a power converter;
an abnormality detection unit configured to detect the fact that a current flowing in said semiconductor devices of said power converter has exceeded a specified value, and to output an abnormality signal when that fact is detected; and
a control unit configured to send gate signals to said gate driving unit and to control said power converter, wherein said gate driving unit comprises:
a gate constriction unit configured to constrict current supplied to gates of said semiconductor devices when an abnormality signal is inputted from said abnormality detection unit;
a gate breaking unit configured to output gate breaking signals for stopping said power converter; and
a gate ON unit configured to maintain a gate signal for said semiconductor device that has become abnormal in the ON state, and to render said gate signal for said semiconductor device OFF after a current flowing in said semiconductor device has become smaller than a specified value.

4. A power converter control device according to claim 3, further comprising:
a comparator configured to output a signal when the current flowing in said semiconductor devices of said power converter exceeds a specified value;
a latch circuit configured to latch said output signal of said comparator; and
a drive transistor configured to be turned ON by said output signal of said latch circuit, and to drive said gate constriction unit and said gate breaking output unit of said gate driving unit.

5. A power converter control device according to claim 4, further comprising:
a latch clearing circuit configured to clear said latch circuit.

6. A power converter control device according to claim 3, wherein:
when an abnormality signal is inputted from said abnormality detection unit, in the event of gate signal for said semiconductor device that has become abnormal being ON, said gate ON unit forcibly maintains said gate signal for said semiconductor device in the ON state.

7. A power converter control device according to claim 3, wherein:
when an abnormality signal is inputted from said abnormality detection unit, regardless of whether said gate signal for said semiconductor device that has become abnormal is ON or OFF, said gate ON unit forcibly maintains said gate signal for said semiconductor device in the ON state.

8. A power converter control device according to claim 3, wherein:
when an abnormality signal is inputted from said abnormality detection unit, regardless of whether said gate signals for not only the semiconductor device that has become abnormal but also for said normal semiconductor devices are ON or OFF, said gate ON unit forcibly maintains the gate signals for all said semiconductor devices in the ON state.

9. A power converter control device according to claim 3, wherein:
said gate ON unit forcibly renders all said semiconductor devices in the ON state for a specified period of time from the time when an abnormality signal is inputted from said abnormality detection unit and, after the specified period of time has elapsed, once more renders gate signals of all said semiconductor devices ON.

10. A power converter control device according to any one of claim 3 to claim 9, wherein:
current flowing in the semiconductor devices of said power converter is detected by using at least one Hall CT (current transformer).

11. A power converter control device according to claim 10, wherein:
in the case of said power converter being composed of both an inverter device and a converter device, said at least one Hall CT includes two Hall CTs, and said two Hall CTs are provided separately on an inverter device side and a converter device side, on a positive side or a negative side of a smoothing capacitor.

12. A power converter control device according to claim 10, wherein:
in the case of semiconductor devices of said power converter being of parallel-connected composition and smoothing capacitors also being parallel-connected, said at least one Hall CT are provided on said positive side or said negative side of at least one smoothing capacitor.

13. A power converter control device according to claim 10, wherein:
in the case of semiconductor devices of said power converter having a single composition and smoothing capacitors being parallel-connected, said at least one Hall CT are provided on said positive side or said negative side of at least one smoothing capacitor.

14. A power converter control device according to claim 10, wherein:
in the case of smoothing capacitors being parallel-connected, a short-circuit detection capacitor that is separate from said smoothing capacitors is connected in a position that is uniform composition-wise with regard to the positive side bus-line and the negative side bus-line of said power converter and, at the same time, said at least one Hall CT is provided on the positive side or the negative side of said short-circuit detection capacitor.

15. A power converter control device according to claim 10, further comprising:
in the case of said semiconductor devices of said power converter being of parallel-connected composition and the U-phase, V-phase and W-phase semiconductor device stacks being separated phase by phase, at least one Hall CT is configured for each phase.

* * * * *